United States Patent [19]

Coyle

[11] 4,300,924
[45] Nov. 17, 1981

[54] EXHAUST GAS SCRUBBER FOR INTERNAL COMBUSTION ENGINES

[75] Inventor: Charles F. Coyle, Portland, Oreg.

[73] Assignee: Paccar Inc., Bellevue, Wash.

[21] Appl. No.: 132,855

[22] Filed: Mar. 24, 1980

[51] Int. Cl.³ .......................... B01D 47/00; F01N 3/04
[52] U.S. Cl. ......................................... 55/210; 55/227; 55/245; 55/246; 55/249; 55/255; 55/DIG. 30; 261/77; 261/123; 60/310
[58] Field of Search ................. 55/216, 227, 245, 246, 55/249, 255, 256, DIG. 30, 210; 261/77, 123; 60/310

[56] References Cited

U.S. PATENT DOCUMENTS

| | | | |
|---|---|---|---|
| 586,923 | 7/1897 | Aldrich | 55/227 |
| 2,164,833 | 7/1939 | Norman | 55/227 |
| 2,612,745 | 10/1952 | Vecchio | 55/256 |
| 2,686,399 | 8/1954 | Stoltz | 55/DIG. 30 |
| 2,877,098 | 3/1959 | Ruth | 60/310 |
| 3,383,854 | 5/1968 | White | 60/29 |
| 3,485,015 | 12/1969 | Vecchio | 261/123 |
| 3,561,194 | 2/1971 | Baldwin et al. | 55/249 |
| 3,608,279 | 9/1971 | West | 55/227 |
| 3,768,981 | 10/1973 | Alliger | 55/255 |
| 3,976,456 | 8/1976 | Alcock | 55/238 |
| 4,078,908 | 3/1978 | Blackman | 261/123 |
| 4,137,715 | 2/1979 | Tung-lung et al. | 55/DIG. 30 |
| 4,190,629 | 2/1980 | Strachan | 261/123 |

FOREIGN PATENT DOCUMENTS

| | | | |
|---|---|---|---|
| 337037 | 3/1904 | France | 55/246 |
| 630583 | 12/1927 | France | 55/227 |
| 1401333 | 7/1975 | United Kingdom | 55/255 |
| 538145 | 3/1977 | U.S.S.R. | 60/310 |

*Primary Examiner*—David L. Lacey
*Attorney, Agent, or Firm*—Klarquist, Sparkman, Campbell, Leigh, Whinston & Dellett

[57] ABSTRACT

An exhaust gas scrubber includes a closed tank partially filled with a pool of water and a core assembly within the tank. The assembly includes a vertical cylindrical mixing tube open at its opposite ends and extending above and below water level, an upwardly opening cylindrical deflector cup at the bottom of the tank with its opening concentrically spaced within the lower end of the mixing tube, and a downwardly opening cylindrical deflector hood concentrically receiving the upper end of the mixing tube. Exhaust gases are introduced into the tank through a gas inlet tube, which extends downwardly concentrically through the deflector hood and mixing tube to discharge the gases through its open lower end into the cup. The gases are deflected upwardly into an annular mixing and expansion chamber within the mixing tube through an annular gas orifice defined by an upper side wall of the cup and lower side wall of the inlet tube. As the gases enter the mixing chamber, they aspirate water droplets through an annular water orifice surrounding the gas orifice. The water droplets and gases intermix as they rise through the mixing chamber. The mixture further expands as it is expelled from its upper end, and is then deflected downwardly by the hood toward the pool of water. The water droplets return to the pool, while the lighter, expanded, cleansed and cooled gases are expelled from the tank through a gas exhaust tube. The scrubber as described can be used in either a make-up type water tank or a batch-type tank, both of which are disclosed and characterized by a tall narrow water pool surrounding the core.

17 Claims, 6 Drawing Figures

EXHAUST GAS SCRUBBER FOR INTERNAL COMBUSTION ENGINES

BACKGROUND OF THE INVENTION

This invention relates generally to exhaust scrubbers for internal combustion engines, and more particularly to water scrubbers of the type which aspirate water into the stream of hot exhaust gases to cool them and remove pollutants before exhausting the gases into the atmosphere.

Reducing the pollutants and high temperatures of internal combustion engine exhaust and the temperatures of hot surfaces in underground mining vehicles is essential to the safety of mine personnel in underground coal mines. Diesel engines exhaust hot sulfurous gases, aldehydes, nitrogen oxide, unburned hydrocarbons and particulate pollutants. Hot exhaust emissions, typically 800° to 1000° F., and hot engine surfaces can ignite combustible gases and material present in underground mines, such as methane and coal dust.

Water jacketing the engine's exhaust manifold and piping in conjunction with the engine's cooling system reduces engine surface temperatures sufficiently to meet safety requirements. However, the safety hazard and pollution problems caused by hot exhaust emissions have proven more difficult to solve. Large volumes of ventilation air must be pumped into deep mines at great cost to dilute the exhaust gases of each diesel engine used in the mines and ventilation alone is insufficient to allay the safety hazards of hot exhaust gases in mines. Therefore, a variety of devices have been proposed for cooling and removing pollutants from the exhaust gases of internal combustion engines used in underground mines.

One type of device, of which the exhaust cleaner proposed by White in U.S. Pat. No. 3,383,854 is an example, sprays water or foam directly into the exhaust gas stream as it flows along a tortuous path. However, such devices increase engine back pressure, reducing effective horsepower and time between overhauls. Water mixed with the exhaust gases becomes highly acidic and dirty with exhaust particulate matter. Consequently, the spray-type devices are also unreliable because the dirty, corrosive water fouls the pumps, nozzles and filters used in such devices, necessitating frequent cleaning. In addition, such parts must be made of stainless steel, which is very expensive.

A second type of device bubbles exhaust gases through a water bath and then passes the gases through a water eliminator, as disclosed in U.S. Pat. No. 3,768,981 to Alliger and U.S. Pat. No. 3,561,194 to Baldwin, et al. Water bath devices increase back pressure on the engine more than is acceptable, particularly when full. Also, the pump used in the Baldwin device is likely to be fouled.

In a third kind of device, a stream of exhaust gases passes through a venturi tube to suck water droplets from a water chamber into the gas stream, as disclosed in U.S. Pat. No. 4,137,715 to Tung-Lung et al. However, such devices tend to be very sensitive to water levels. Filters, when used in such devices, also require frequent cleaning.

Besides the foregoing problems, many such devices inadequately mix the water and gases to effectively cleanse the gases. Also, many such devices discharge substantial amounts of entrained water together with the gases, resulting in excessive water consumption and steam generation which strains the water storage capacity of the devices and impairs mine visibility.

Because of the inadequacies of the foregoing devices, aspirated or induced water scrubbers, such as that disclosed in U.S. Pat. No. 3,976,456 to Alcock, have come into wide use. Such scrubbers typically include a scrubber tank partially filled with water or other scrubbing liquid. The exhaust gases enter the tank above the water level, are piped downwardly below the water level, and then directed upwardly at an angle. A submerged slot or orifice in the region where the gases change direction admits water into the gas stream. The gas-water mixture then enters an expansion and mixing chamber and flows upwardly above the water level. At the top of the mixing chamber the mixture is redirected downwardly by a curved duct and discharged over the water, impelling the water droplets and particles in the mixture into the water. The cooled exhaust gases are then discharged into the atmosphere.

Such scrubbers are of two types. A make-up type scrubber has a make-up water tank or reservoir and a make-up float valve for adding water to the scrubber tank to maintain a desired water level. A batch-type scrubber has a large tank for containing enough water to run for an extended period of time before refilling. Both types are provided with a float-operated safety valve for shutting down the engine if the water level drops below a safe minimum.

Engine back pressure is lower with aspirated water scrubbers than with other exhaust cleaning or cooling devices, but a number of other problems remain unsolved. For example, aspirated water scrubbers similar in principle to the Alcock device, have a specific water consumption of about 0.25 to 0.3 gallons per brake horsepower hour. However, an even lower water consumption is desired to further reduce water storage requirements and steam generation.

At the same time, existing scrubbers only remove about 30% of particulate exhaust emissions. About 90% of the particles emitted are less than 0.5 microns in diameter. Existing scrubbers either do not aspirate enough water or do not mix the water that is aspirated well enough with the gases to wet and thereby trap such small particles. In the Alcock device, water is not aspirated uniformly into the flowing gases. Moreover, the curvature of the expansion tube inhibits mixing of the water with the gases. The water is aspirated into the lower portion of the gas stream and most of it follows the outside curves of expansion tube under the influence of centrifugal force.

Another problem is that the water in such scrubbers sloshes as the vehicle moves and the water level in the tank shifts in response to changes in grade. The submerged orifice of such scrubbers can thus be briefly subjected to unacceptably low water levels or even exposed so that cooled, cleansed exhaust gases rather than water are drawn into the stream of hot, dirty gases, causing a momentary reduction or lapse in the scrubbing action. Changes in water level due to sloshing or grade changes can also actuate the safety valve, causing premature shutdown of the engine. Attempts to solve this problem by use of baffles and a separate float chamber have not been successful.

Yet another problem with existing aspirator-type scrubbers is the difficulty of producing such scrubbers and their concomitantly high manufacturing cost. In particular, the convergent inlet section and curved divergent expansion chamber are quite expensive to manufacture.

A further problem is the poor reliability of float-type water valves when they are exposed to the dirty, highly corrosive scrubbing liquid inside the scrubber tank. They frequently malfunction or may fail to shut down the engine when the water level gets too low. Use of stainless steel, rather than brass floats and valves adds much to the cost of make-up type scrubbers. This problem has led mine equipment users to preferentially use batch-type aspirated water scrubbers and to use thermally-actuated engine shutdown control valves which sense the temperature of discharged exhaust gases. However, existing batch-type scrubbers pose additional problems.

Because they contain all the water required for up to 8 hours of operation, batch-type scrubber tanks have an initially higher water level than make-up scrubbers. In existing batch scrubber designs, the higher level causes excessive engine back pressure and discharge of water. Such scrubbers must also operate over a wide range of water levels, but existing scrubbers have not done so successfully. For example, the Alcock design has a water level range of only about 5 inches, which would require a very large tank to hold sufficient water to run 8 hours if used as a batch-type scrubber. Such a large tank requires more extensive baffling and stiffening to minimize sloshing and withstand the high pressures of explosions than a smaller tank would require.

Use of thermally-actuated control valves does not insure engine shutdown if the water level becomes too low. Thus, the scrubber can fail to effectively arrest flame propagation in the event of an explosion. This possibility necessitates a flame arrester in the exhaust gas orifice. However, flame arresters add to the expense of the scrubber, increase engine back pressure, particularly when they become dirty, and require daily cleaning.

Accordingly, there is a need for an improved exhaust gas scrubber of the aspirator type for internal combustion engines, especially such engines of underground mining vehicles, for overcoming the foregoing problems.

SUMMARY OF THE INVENTION

A primary object of the invention is to provide an improved aspirated water scrubber especially suitable for use in underground mining vehicles.

Another primary object of the invention is to reduce the susceptibility of such scrubbers to sloshing and fluctuations in water level.

A further primary object is to enable the use of float-controlled valves in such scrubbers while minimizing the risks of their malfunctioning.

Yet another object is to obtain improved scrubbing of the exhaust gases while reducing the amount of water discharged into the atmosphere.

Other objects include:

1. Avoiding the need for high cost float and valve components in aspirated water scrubbers;
2. Simplifying the structure of such scrubbers;
3. Reducing the cost of such scrubbers;
4. Minimizing engine back pressure;
5. Minimizing water consumption;
6. Providing a scrubber that will more readily withstand and dampen internal explosions;
7. Eliminating the need for flame arresters;
8. Avoiding premature engine shutdown;
9. Providing a scrubber that will operate effectively with wide variations of water level; and
10. Increasing the amount of water aspirated and uniformly mixing such water into the gases.

According to the invention, an aspirated water scrubber has a scrubber core including an elongated mixing tube surrounding an exhaust gas inlet tube leading downwardly into a pool of scrubbing liquid, such as water, within a closed tank. A bottom opening of the inlet tube opens downwardly into first deflector or flow reversal means for deflecting the gases upwardly through a narrow annular gas orifice surrounding the inlet tube to reverse and constrict the flow of gases. This action produces a high velocity upward flow of gases past an aspirator means, which can include an annular water orifice surrounding the gas orifice to aspirate water into the upward gas flow. The water and gases enter and expand within the mixing tube, in a turbulent flow, thoroughly intermixing to cool and scrub the gases. At the upper end of the mixing tube the mixture encounters a second deflector or flow reversal means for reversing or deflecting the direction of flow of the gas-water mixture so as to impel droplets of water and exhaust particles into the pool surrounding the mixing tube to separate the water from the cooled gases. The downward spray of water droplets cools the gases further as they rise toward an exhaust gas outlet. The deflector means can also allow further expansion of the mixture to further reduce its velocity.

In a make-up type scrubber of the invention, the scrubber tank is vertically elongated to provide a tall, narrow pool of liquid surrounding the scrubber core to minimize sloshing and its effects.

Similarly, in a batch-type scrubber of the invention, the relatively large scrubber tank has one pair of opposite side walls close to the scrubber core, but another pair of opposite side walls spaced far from the core. However, a pair of baffles extends between the latter walls and the core and lie close to the core to provide a relatively narrow, tall pool of water surrounding around the scrubber core, giving the same effect as the make-up type scrubber tank.

A float positioned next to the scrubber core is mounted on a sealed rotating shaft which extends through a side wall of the tank. Water level control valves and an engine safety shut down switch are mounted on the shaft outside the tank to isolate them from the corrosive contents of the tank.

The foregoing and other objects, features and advantages of the invention will become more readily apparent from the following detailed description of two embodiments which proceeds with reference to the accompanying drawings.

DETAILED DESCRIPTION OF PREFERRED EMBODIMENTS

Figure 1:
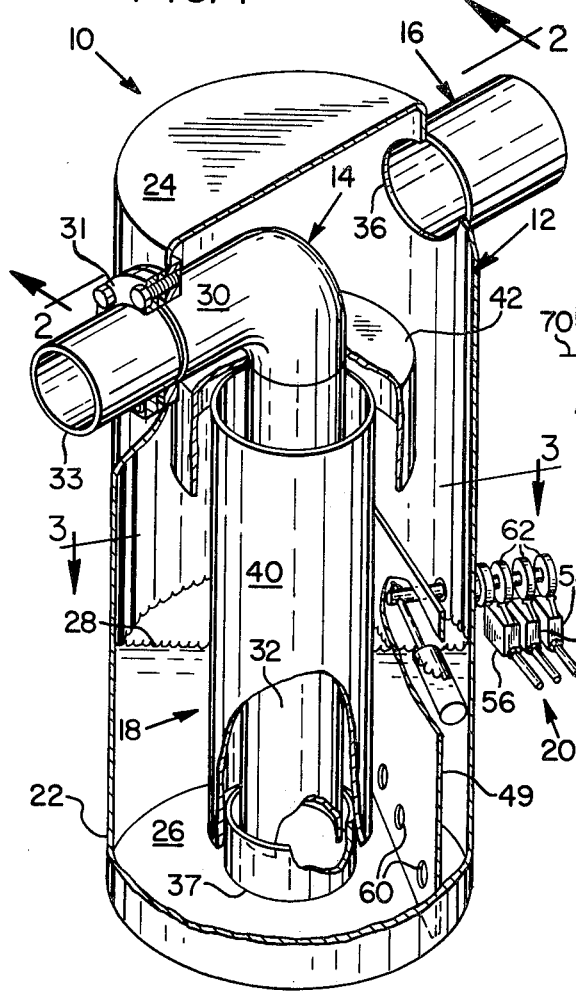
FIG. 1 is a perspective view of a make-up type scrubber according to the invention, portions of the scrubber tank and core being cut away to show interior construction.

In the following description of two embodiments of the invention, like reference numerals identify like parts which are common to both embodiments.

Make-Up Type Water Scrubber

Figure 2:
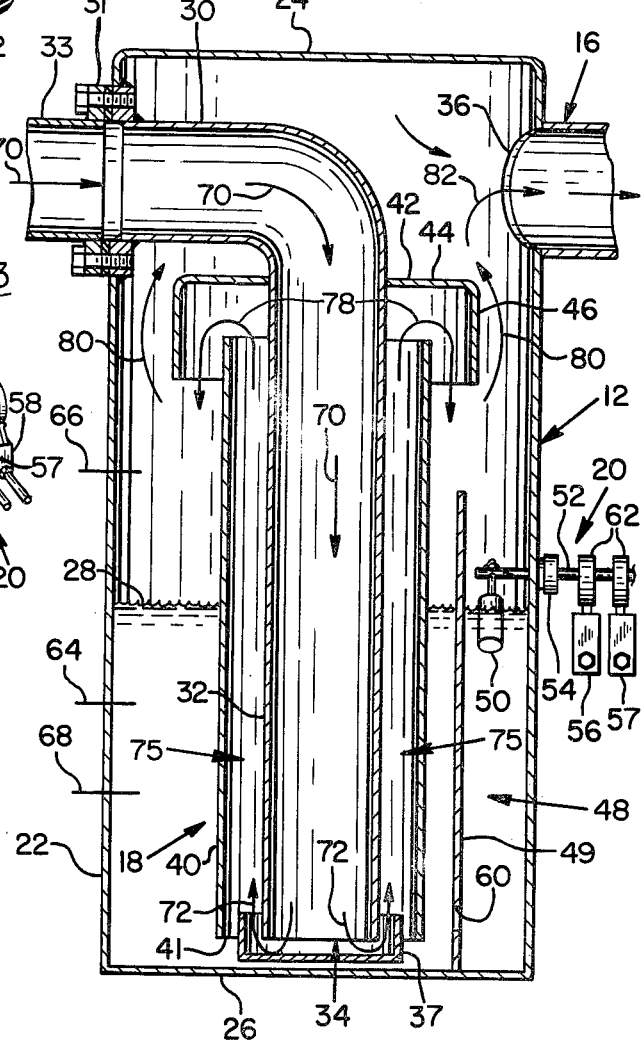
FIG. 2 is a vertical cross-sectional view taken along line 2—2 in FIG. 1.

Referring to FIGS. 1 and 2, a make-up type water scrubber 10 comprises a scrubber tank 12, an exhaust inlet tube 14, an exhaust outlet tube 16, a scrubber core 18, a float-actuated control mechanism 20, and a make-up liquid tank and pipe (not shown).

Scrubber tank 12 is a vertically-elongated stainless steel cannister having a cylindrical side wall 22 sealed at its ends by top and bottom walls 24, 26 for containing a pool of scrubbing liquid, such as water 28, and exhaust gases (now shown) above the surface of the liquid. The narrow, vertically elongated shape of the cannister provides a deep narrow pool of liquid which is relatively immune to sloshing and normal grade variations. The cylindrically-shaped tank is also unlikely to deform when an explosion occurs in the tank.

The exhaust inlet tube 14 has a horizontal portion 30 gently curving into a vertical portion 32. The horizontal portion extends into the scrubber tank from an inlet flange 31 surrounding an opening in side wall 22 just below top wall 24. The inlet flange is adapted for connection to the exhaust pipe 33 of an internal combustion engine (not shown). The vertical portion leads downwardly through the center of the tank to an exhaust opening 34 (FIG. 2) spaced above bottom wall 26.

The exhaust outlet tube 16 extends from an opening 36 in side wall 22 just below top wall 24 to emit cooled gases from the scrubber into the atmosphere or into another apparatus.

The scrubber core 18 includes a first deflector or cup 37, an open-ended mixing tube 40 and a second deflector 42.

Cup 37 has a cylindrical side wall 38 defining a collar concentrically surrounding the exhaust opening 34, and a bottom wall 39 spaced slightly above bottom wall 26 so that water can flow beneath the cup to cool walls 26 and 39. Side wall 38 extends upwardly a short distance from the inlet tube to define an annular water orifice 74 (FIG. 4) surrounding such tube. The cross-sectional area of orifice 74 is less than the cross-sectional area of opening 34, but not so much less that engine back pressure becomes excessive. A suitable ratio of such areas is in the range of 0.6 to 0.8.

Figure 3:
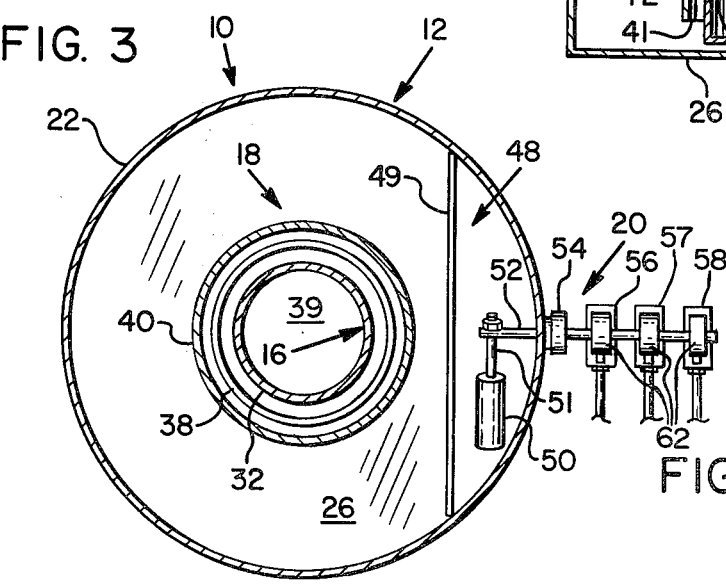
FIG. 3 is a horizontal cross-sectional view taken along line 3—3 in FIG. 1.
Figure 4:
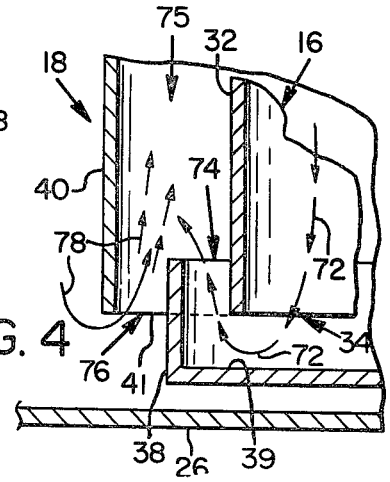
FIG. 4 is an enlarged vertical cross-sectional view of a lower portion of FIG. 3 showing aspiration of water into the mixing chamber by the exhaust gases.

Mixing tube 40 concentrically surrounds the vertical portion of the exhaust tube and the deflector cup to define an annular expansion chamber 75 surrounding the exhaust tube and an annular water orifice 76 surrounding side wall 38, best seen in FIGS. 3 and 4. The lower end 41 of tube 40 is approximately level with exhaust opening 34. The mixing tube extends upwardly above the water level along much of the length of vertical portion 32.

The mixing tube is spaced outwardly from the side wall of the cup a distance such that the ratio of the cross-sectional areas of orifice 74 to mixing chamber 75 is in an optimum range of 0.4 to 0.5. Greater or lesser ratios will also work, but reduce the efficiency of aspiration if too great and unduly increase engine back pressure if too low.

Deflector 42 forms an annular hood over the open upper end of the mixing tube just below the horizontal portion of exhaust tube 16. The deflector has a horizontal top wall 44 radiating outwardly from vertical portion 32 and a cylindrical side wall or skirt 46 depending from the periphery of top wall 44. The lower edge of skirt 46 overhangs the upper end of the mixing tube sufficiently to direct the mixture toward the water surface 28. Skirt 46 is spaced outwardly from the mixing tube sufficiently to further expand the mixture, but not so far as to constrict the upward flow of gases toward outlet tube 16 between the deflector and side wall 22, as indicated by arrow 80. Such flow must be less than about 600 feet per minute to avoid carrying water droplets out of the scrubber. The scrubber is preferably designed for an average upward gas flow rate around the deflector skirt of about 400 feet per minute, so that the maximum flow rate is less than about 500 feet per minute.

Brackets or gussets (not shown) interconnect the lower ends of mixing tube 40, exhaust inlet tube portion 32 and cup 37. Additional brackets (not shown) interconnect the upper ends of tube 40, tube portion 32 and deflector hood 42. Brackets also connect the mixing tube to tank side wall 22 to support the scrubber core in the tank.

The float-actuated control mechanism 20 includes a float or stilling chamber 48 defined by a vertical baffle 49, a float 50, a rotating float shaft 52, sealed shaft fitting 54, water level sensing valves 56, 57, and safety shut-down switch or valve 58.

Referring to FIG. 3, baffle 49 extends along a chord between two points on the inner side of side wall 22 to define float chamber 48. The float chamber is preferably just large enough for float 50 to move freely up and down between the baffle and the side wall in response to changes in water level. The baffle has small openings 60 near bottom wall 26 to equalize the water level on opposite sides of the baffle. The float chamber is sufficiently tall and narrow to reduce the effects of sloshing and grade changes on the float.

Float 50 is connected to shaft 52 by a radial arm 51 so that changes in water level raising and lowering the float rotate the shaft within fitting 54. The fitting comprises a pipe fitting screwed into a mating fitting welded into an opening in side wall 22 at a position midway between high water level 66 and shut down water level 68. A commercial O-ring seal (now shown) of a type which is compatible with corrosive water solutions seals the pipe fitting around shaft 52.

Sensing valves 56, 57 are mounted on shaft 52 outside the scrubber tank, where they are isolated from corrosive scrubbing liquid. The valves utilize either pneumatic or hydraulic pressure to control the addition of make-up water to the scrubber tank. Each valve includes a cam 62 mounted for rotation on shaft 52 in position along the shaft to actuate the valve mechanism.

Cams 62 are rotationally positioned on shaft 52 so as to actuate their respective valves at different float positions. The cam for sensing valve 56 is positioned to actuate valve 56 to add water to the scrubber tank from a make-up water valve and tank (not shown) when the float descends to a "refill" level 64. The cam of valve 57 is positioned to actuate valve 57 to cease adding make-up water when the float ascends to a "full" level 66. The cam in safety valve 58 is positioned to actuate valve 58 to shut down the engine (not shown) when the float descends to "shutdown" level 68 below the "refill" level.

Sensing valves 56 and 57 keep the scrubber tank supplied with water until the make-up tank is empty, maintaining the water level above the "refill" level. Thereafter, the water level drops to the shutdown level, to activate safety shutdown valve 58, to shut down the engine before the water level gets so low that the scrubber ceases to act as an effective flame arrestor.

Tank 12, exhaust inlet tube 14, outlet tube 16, cup 37, mixing tube 40, deflector 42, baffle 49, float 50 and fitting 54 are all preferably made of stainless steel. Shaft 52 is preferably bronze aluminum alloy and the O-ring is preferably made of "Viton", a well-known brand of flourocarbon elastomer. Inlet flange 30 and valves 56, 57 and 58 can be constructed of low cost corrosible components since they are unexposed to corrosive scrubber water.

Batch-type Water Scrubber

Figures 5, 6:
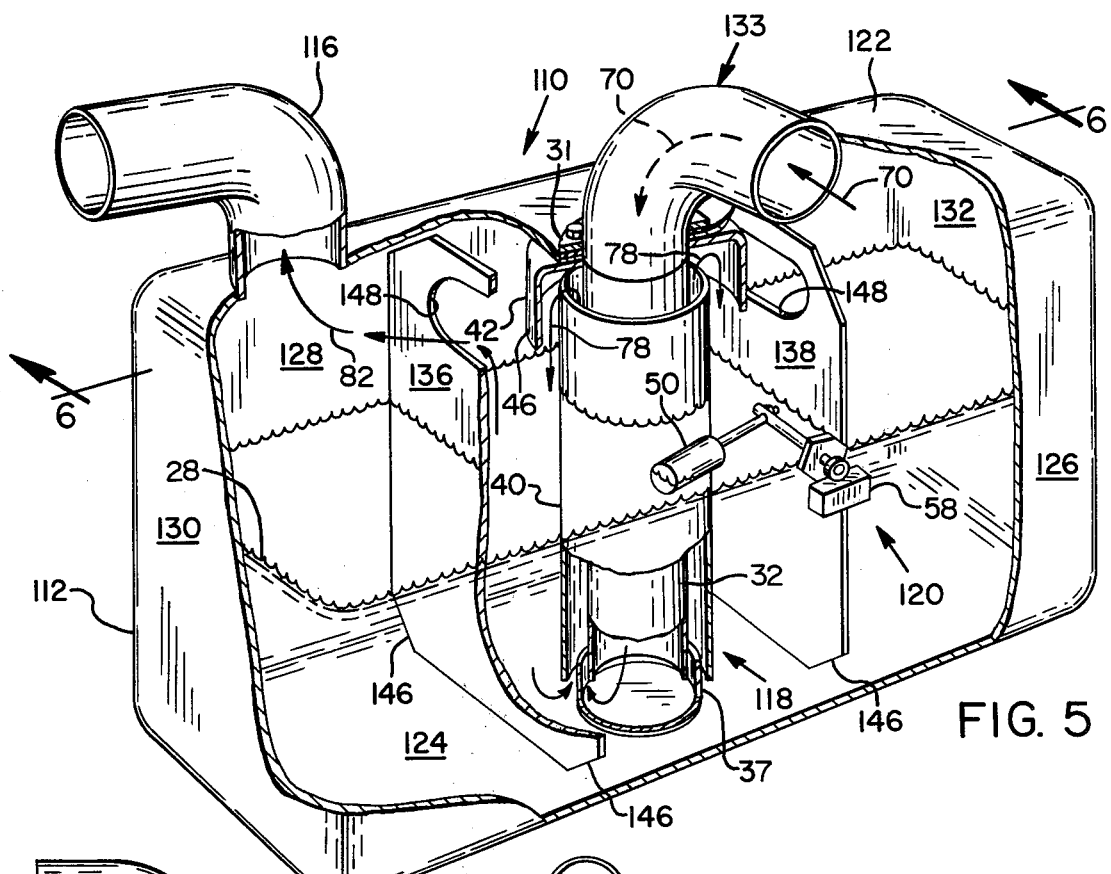
FIG. 5 is a perspective view of a batch-type scrubber according to the invention, portions of the tank, baffles and core being cut away to show interior construction.
FIG. 6 is a vertical cross-sectional view taken along line 6—6 in FIG. 5, with only small portions of the exhaust inlet and outlet tubes being cut away.

Referring to FIGS. 5 and 6, a batch-type water scrubber 110 comprises a scrubber tank 112, an exhaust inlet tube 133, an exhaust outlet tube 116, a scrubber core 118 and a float-actuated control mechanism 120.

Instead of employing a make-up water tank as a source of additional scrubbing water, the batch-type scrubber uses a scrubber tank 112 whose water volume is large enough to operate for an extended length of time before refilling, for example, one eight hour work shift. Tank 112 is an oblong, rectangular tank with top and bottom walls 122, 124, opposite side walls 126, 128 and end walls 130, 132. A capped refill opening 134 is located in the top wall near end wall 132. The shape of the tank and the position of the refill opening can be changed as needed to conform to the space availability in different mining vehicles.

Side walls 126, 128 are spaced closely together to minimize sloshing and the effects of sudden grade changes on water level in one lateral dimension. Two parallel baffles 136, 138 extend across the inside of the tank between the side walls. The baffles are spaced closely together to minimize sloshing and the effect of sudden grade changes in the other lateral dimension.

The side walls and baffles form wall means which define tall, narrow central scrubber chamber 140 and two storage chambers 142, 144 at each end of the tank. Notches 146 at the lower corners of the baffles provide small openings for water to flow from one chamber to the other. Oblong openings 148 near the tops of each baffle allow gases to flow from one chamber to the other.

The scrubber core is centered in the tank within chamber 140 to further minimize the effects of grade changes. The exhaust inlet tube 133 has a vertical tube portion 32 extending downwardly from an inlet flange 31 surrounding an opening in upper wall 122. Scrubber core 118 is substantially the same as core 18 of the make-up type scrubber, except that deflector head 42 can be connected either to the underside of wall 122 or to inlet tube portion 32. Outlet tube 116 is connected to an opening in top wall 122 above storage chamber 142.

Float mechanism 120, positioned along side wall 126, is substantially the same as mechanism 20 in the make-up scrubber. However, it has only one water level sensing valve or switch, safety shutdown valve 58. Float 50 is approximately centered between the baffles alongside the scrubber core. The float mechanism is positioned low enough vertically to sense the minimum level of water at which the scrubber will prevent flame propagation in case of engine backfire or an explosion in the scrubber core. Cam 62 is adjusted rotationally on shaft 52 to insure that the valve shuts down the engine when that minimum level is reached.

Operation

Preparatory to operation, both embodiments of the scrubber are initially filled with water or other suitable scrubbing liquid. In the make-up type scrubber, the make-up tank is also filled. The batch-type scrubber is filled to a level substantially above the float but below the lower edge of deflector side wall 46. The maximum water depth should be observed in filling the scrubber tank to avoid agitation of the water surface and overly high initial water consumption and engine back pressures. When the engine is started, any water inside cup 37, the mixing tube 40, and the end of exhaust tube 16 is displaced by the gases. The displaced water should not raise the water level above such maximum.

Accordingly, the tank should not be filled above a maximum static water level which is about four inches below the skirt of the deflector hood in the make-up scrubber and about three inches below the hood in the batch scrubber, depending on tank size.

In operation of the scrubber, the hot exhaust gases of an internal combustion engine travel via a water-jacketed exhaust pipe 33, 133 through the scrubber exhaust inlet flange 31 into inlet tube 14, 114. The hot gases enter the scrubber, as indicated by arrows 70 in FIGS. 2 and 5, and flow downwardly toward opening 34.

The downwardly flowing gases exit opening 34 and are immediately deflected laterally and then upwardly by cup 37, effecting a flow reversal, as indicated by arrows 72 in FIGS. 2, 4 and 6. The annular orifice constricts and accelerates the flow of gases to that they flow upwardly at high velocity all around the end of exhaust tube 16 into the mixing chamber 75.

As the gases flow through orifice 74 into the mixing chamber, they expand to draw water through annular water orifice 76 and aspirate such water as fine droplets uniformly into the upwardly flowing stream of gases, as indicated by arrows 78 in FIG. 4.

The reversal of the flow of gases, their velocity as they pass through orifice 74, and their sudden expansion as they enter the mixing chamber combine to make the gas flow in the mixing tube quite turbulent. Such turbulence mixes the water droplets thoroughly with the gases to quickly cool the gases and to wet and thereby trap many of the particles and other pollutants in the gases.

The mixture of gases and water droplets flows upwardly around the outside of the vertical portion of the exhaust tube, which is also cooled somewhat by the water. At the upper opening of the mixing tube, a second flow reversal is effected by deflector 40 as indicated by arrows 78 in FIGS. 2 and 6. The mixture is deflected laterally and then downwardly by deflector walls 44, 46. This action impels the mixture toward the surface of water 28. At the same time the mixture is expanded a second time to further reduce its velocity. The water droplets and exhaust particles striking the water surface are thus captured.

The now-cooled gases rise toward the top of the scrubber tank around skirt 46, as indicated by arrows 80 in FIGS. 2 and 6. The rising gases are further cooled by the downward spray of water droplets from the deflector. The gases then flow toward the exhaust gas outlet, as indicated by arrows 82. The gases exit the tank substantially free of water droplets and at a much reduced temperature and level of water-soluble and particulate pollutants.

Nearly all of the scrubbing liquid not vaporized to cool the gases is returned to the pool, minimizing the need to replenish the liquid. Because of the lower water capacity of the make-up scrubber tank, water must be replenished periodically to maintain the water level. This is done automatically by the make-up float mechanism sensing the water level and adding water from the make-up tank. Because the batch-type scrubber has a very large capacity in a laterally-extending pool, its water level goes down more slowly than that of the make-up scrubber. As the water level in the central scrubber chamber between baffles 136 and 138 drops, water flows in from the storage chambers 142, 144.

Backfires of the engine or explosions of combustible gases sometimes occur within the exhaust pipe or scrubber inlet tube. However, the cylindrical shape of the scrubber core resists deformation better than the square shape used in prior scrubbers. Moreover, the explosion is dampened because the increased velocity of exploded gases through orifice 72 induces more water through orifice 74 to cool and thereby contract the volume of the gases. The scrubber core thus absorbs and dampens such explosions to save the tank from damage and to prevent flame propagation from the exhaust outlet.

EXAMPLE

In one example of the foregoing apparatus, the overall height of the scrubber core 18, 118 is about 26 inches. The diameters of the exhaust inlet tube 16, the cup 37, the mixing tube 40 and the deflector 42 are about 5 inches, 6½ inches, 8 inches and 12 inches, respectively. Thus, the cross-sectional areas of the exhaust inlet tube, the mixing chamber and the annular opening between the deflector skirt and the mixing tube are progressively greater by ratios of at least 1.5 to 1. The bottom wall of the cup is spaced about ½ inch above the bottom of the tank and its side wall is about 2½ inches high. The lower ends of the exhaust inlet tube and the mixing tube are spaced about 1¾ inches above the bottom wall of the tank. The top wall 44 of the deflector is spaced about 2½ inches above the upper end of the mixing tube and the deflector skirt 46 extends downwardly therefrom about 5 inches.

A scrubber core of the foregoing dimensions was tested in a make-up scrubber tank about 34 inches high and having a diameter of about 18 inches. It was found that such scrubber cooled exhaust gases to 150°-160° F. without a significant change in water consumption over a range of water depths which varied from a minimum of less than 3 inches to a maximum of about 18 inches. When static water depth exceeded 18 inches or less than about 3 inches below skirt 46, water consumption increased substantially because of agitation of the water surface. Thus, the maximum static water depth during operation of the scrubber should be less than 17 inches.

Somewhat greater minimum water depth, about 5 or 6 inches, would be required by mine safety regulations to prevent flame propagation and to insure explosion suppression. Moreover, provision for a 6-inch minimum water depth, still permits an 11-inch variation in water depth, more than twice the range of the aforementioned Alcock device. Moreover, the make-up scrubber demonstrated an average specific water consumption of less than 0.2 gallons per brake horsepower hour, less than $\frac{2}{3}$ of the water consumption of the Alcock device. The velocity of gases flowing upwardly between the deflector and the tank side wall is less than 500 feet per minute, which helps minimize water discharge through the exhaust outlet. Finally, the engine backpressure was less than 18 inches of water, as measured by a water manometer, throughout the operating range of water depths of the scrubber.

A scrubber core of the foregoing dimensions has also been tested in a batch-type scrubber tank and has given similar results. The ability of the scrubber core to operate effectively over such a wide range of water depth allows a 50 percent reduction in surface area of the tank from that required by prior batch-type scrubbers, without reducing operating time between refills. Accordingly, space requirements for batch-type scrubber tanks are substantially reduced. Sloshing and shifting of water levels within the tank due to grade changes are likewise reduced to the point where simple baffling becomes effective. Centering the scrubber core and float in the tank reduces their susceptibility to any residual grade changes.

The foregoing detailed description and example illustrate specific ways that the invention can be practiced. However, the invention is not so limited. For example, the scrubber core and exhaust inlet tube are described as being cylindrical, but the invention encompasses other geometric shapes as well. In FIGS. 2 and 6, the vertical portion of the exhaust tube, the cup, the mixing tube, and the deflector skirt are parallel-sided cylinders. However, non-parallel structures can also be used. For example, the mixing tube could be an inverted frustoconical tube. Besides deflector hood 42, other means for separating entrained water droplets can be used. Examples include an inertial separator, or swirling tube, and water eliminating vanes.

Having illustrated and described two preferred embodiments of the invention, and several variations thereof, it should be apparent to those skilled in the art that the invention may be mofified in arrangement and detail.

I claim as my invention all such modifications as come within the spirit and scope of the following claims:

1. An exhaust gas scrubber comprising:
   a scrubber tank;
   an exhaust gas inlet tube for conducting hot, dirty exhaust gases downwardly into the tank to an outlet opening;
   a mixing tube surrounding a portion of the inlet tube to define a mixing chamber between said tubes, the mixing tube extending above and below a liquid level in said tank;
   a deflector for reversing the flow of gases emitted from said opening to deflect said flow upwardly into the mixing chamber, the deflector including wall means extending upwardly into the mixing chamber and spaced between the mixing tube and inlet tube to define aspirator means for aspirating scrubbing liquid into the mixing chamber to intermix with, cool and cleanse said gases;
   means for separating the liquid from the gases; and
   an exhaust gas outlet for exhausting cooled, cleansed gases from said tank;

the mixing tube having a downwardly open lower end positioned near the bottom of the scrubber tank.

2. An exhaust gas scrubber according to claim 1 in which:
the deflector is spaced above the bottom of said tank just enough to admit scrubbing liquid thereunder to cool the bottom of the tank;
the deflector wall means terminates above but closely adjacent the lower end of the mixing tube; and
the outlet opening of the exhaust gas inlet tube is below the upper terminus of the deflector wall means.

3. A scrubber according to claim 1 in which said aspirator means includes an inner aspirator gas orifice surrounding said exhaust opening and an outer scrubbing liquid orifice surrounding said inner orifice so that scrubbing liquid can be aspirated into the mixing chamber through substantially the entirety of the outer orifice by gases flowing upwardly through the inner orifice.

4. A scrubber according to claim 1 including liquid level sensing means for sensing a liquid level in said tank and shutdown control means responsive to the level sensing means for actuating shutdown of an engine emitting said exhaust gases when the liquid in the tank drops below a predetermined low level.

5. A scrubber according to claim 4 in which the sensing means includes a float inside said tank, the tank including a baffle wall defining a tall narrow housing for said float.

6. A scrubber according to claim 1 including liquid level sensing means for sensing a liquid level in said tank and make-up liquid control means responsive to the level sensing means for controlling addition of liquid to the tank when the liquid therein drops below a predetermined level.

7. An exhaust gas scrubber comprising:
a scrubber tank containing a pool of scrubbing liquid;
an exhaust gas inlet tube for conducting hot, dirty exhaust gases downwardly into the tank to an outlet opening;
a mixing tube surrounding a portion of the inlet tube to define a mixing chamber between said tubes, the mixing tube extending above and below the liquid level in said tank;
means for directing the flow of gases from said outlet opening upwardly into the mixing chamber and means for aspirating scrubbing liquid into the mixing chamber to intermix with, cool and cleanse said upwardly flowing gases;
means for separating the liquid from the gases; and
an exhaust gas outlet for exhausting cooled, cleansed gases from said tank;
said means for separating the liquid from the gases including a deflector hood surrounding the exhaust inlet tube above an open upper end of said mixing tube, said hood being constructed and arranged for reversing the upward flow of exhaust gases and scrubbing liquid from said mixing chamber to deflect said flow downwardly into the pool of scrubbing liquid to separate the liquid from the cooled, cleansed gases;
said tank having outer side wall means spaced outwardly from the deflector hood to define a passageway therebetween so that the cooled, cleansed gases can flow freely around the deflector hood to the exhaust gas outlet;
the cross-sectional area of the passageway being such that the velocity of gases flowing upwardly around the deflector hood is below a velocity at which the gases would carry liquid droplets upwardly to the exhaust gas outlet.

8. A scrubber according to claim 7 in which the inlet tube, the mixing chamber and an annular opening between the mixing tube and the deflector hood are of progressively greater cross-sectional areas so as to provide expansion means for expanding the volume of said flow of gases, thereby reducing its velocity, following each reversal of said flow.

9. A scrubber according to claim 7 including liquid level sensing means for sensing a liquid level in said tank and make-up liquid control means responsive to the sensing means for controlling addition of liquid to the tank when the liquid level drops below a first predetermined level and for terminating the addition of liquid when the liquid level rises to a second predetermined level spaced below the deflector hood to prevent agitation of the pool of liquid by the gas-liquid mixture directed downwardly into the pool.

10. An exhaust gas scrubber comprising:
a tank containing a pool of scrubbing liquid and an exhaust gas outlet communicating with an upper portion of the tank above the level of said pool;
a mixing tube within said tank extending above and below the level of said pool and open at both an upper end and a lower end;
an exhaust gas inlet tube extending into the tank and downwardly into the mixing tube and terminating at an open outlet end, the walls of the mixing tube being spaced outwardly of the inlet tube to define a mixing chamber therebetween;
first deflector means for reversing the flow of gases emitted from said outlet end to discharge said flow upwardly in said mixing chamber;
annular orifice means defined by said first deflector means and a wall portion of said mixing tube outwardly adjacent the upward gas flow, such that the upward gas flow aspirates droplets of scrubbing liquid into said flow; and
second deflector means surrounding said upper end of the mixing tube for reversing and expanding the upward flow of scrubbing liquid-gas mixture emitted from said upper end and impelling scrubbing liquid droplets downwardly toward the surface of said pool to separate the droplets from the gases;
said tank having outer side wall means spaced apart from the second deflector means to provide a passageway therebetween so that the gases can flow upwardly through a downward spray of liquid droplets and around the second deflector means to said exhaust gas outlet, the cross-sectional area of said passageway being sized to further expand said gases to reduce the velocity below a velocity at which they would carry liquid droplets upwardly to the exhaust gas outlet.

11. An exhaust gas scrubber comprising:
a scrubber tank containing a pool of exhaust gas scrubbing liquid;
an exhaust gas inlet tube entering the scrubbing tank and having an end portion leading vertically downward to a terminal exhaust discharge opening;
an elongated, open-ended mixing tube surrounding the end portion of the exhaust tube and spaced therefrom to define an annular mixing chamber;

a deflector cup receiving said discharge opening for reversing the downward flow of gases emitted from said opening to deflect said gases upwardly into said mixing chamber, the deflector cup having a side wall extending upwardly a short distance into said mixing chamber to define an annular gas orifice surrounding the end portion of the inlet tube and an annular scrubbing liquid orifice surrounding the gas orifice so that the gases flowing upwardly through the gas orifice aspirate scrubbing liquid into the mixing chamber to intermix with said gases; and a deflector hood including a downwardly-extending side wall surrounding the exhaust inlet tube above the upper open end of the mixing tube for reversing the upward flow of the gas-scrubbing liquid mixture emitted from the mixing chamber to deflect said mixture downwardly toward the surface of said pool so as to separate droplets of scrubbing liquid from the now-cooled gases; and an outlet opening for exhausting the now-cooled gases from the scrubber tank;

the mixing tube and the deflector hood being operable to progressively expand the gases, thereby reducing the velocity of said gases;

the scrubber tank being spaced outwardly from the deflector hood so that the now-cooled gases can flow freely therebetween to the outlet opening.

12. A scrubber according to claim 11 in which:

the cross-sectional area of the gas orifice is less than the cross-sectional area of the exhaust discharge opening;

the cross-sectional area of the mixing chamber is greater than the cross-sectional area of the gas orifice; and the deflector hood side wall is spaced outwardly from the mixing tube to define an annular opening between the deflector hood and the mixing tube whose cross-sectional area is greater than the cross-sectional area of the mixing chamber;

whereby the flow of exhaust gases is first constricted to increase the gas velocity through the gas orifice, then suddenly expanded as the flow enters the mixing chamber and further expanded as the flow is reversed in the deflector.

13. A scrubber according to claim 12 in which the ratio of cross-sectional areas of the gas orifice to that of the mixing chamber is between 0.4 and 0.5.

14. A scrubber according to claim 12 in which said cross-sectional areas are progressively greater by ratios of at least 1.5 to 1.

15. A scrubber according to claim 11 including wall means defining a scrubber chamber for containing said scrubbing liquid in a narrow pool surrounding said mixing tube, said wall means being spaced outwardly from the deflector hood sufficiently to slow the cooled gases as they flow toward the exhaust outlet to a velocity below that at which the gases would tend to carry scrubbing liquid droplets to said outlet.

16. A scrubber according to claim 11 in which the scrubber tank has a vertically cylindrical side wall for containing a narrow annular low-volume pool of said liquid surrounding said mixing tube;

said deflector cup being positioned close to the bottom of the scrubber tank;

said scrubber including make-up liquid control means for controlling the addition of liquid to said tank to maintain at least a minimum level of liquid in said tank;

the make-up liquid control means including:

a float inside the scrubber tank having a rotating shaft extending through said side wall; and a valve outside said scrubber tank for adding liquid to the scrubber tank in response rotation of said shaft so as to enable the liquid level to drop to a minimum in a lower portion of the tank and then refill the tank to a maximum level sufficiently below the lowest extent of said deflector hood to minimize agitation of the liquid by the gases and droplets deflected downward by the deflector hood.

17. A scrubber according to claim 11 in which the scrubber tank is laterally enlarged for containing a sufficiently large volume of said liquid for the scrubber to be used for an extended period of time without refilling; and includes shutdown means for shutting down an engine generating said exhaust gases when the liquid reaches a minimum level, and wall means defining a scrubber chamber approximately centered in said tank for containing a portion of said large volume of liquid in a narrow pool surrounding said mixing tube;

the shutdown means including:

a float inside said tank near said mixing tube having a rotating shaft extending through a side wall of said tank; and a valve outside said tank operable to shut down said engine in response to rotation of said shaft.

* * * * *